(12) United States Patent
Leone

(10) Patent No.: US 6,780,929 B1
(45) Date of Patent: Aug. 24, 2004

(54) VALVE OR PUMP JOINT

(75) Inventor: Patrice Leone, Acquigny (FR)

(73) Assignee: Valois S.A., Le Neubourg (FR)

( * ) Notice: Subject to any disclaimer, the term of this patent is extended or adjusted under 35 U.S.C. 154(b) by 0 days.

(21) Appl. No.: 09/868,137

(22) PCT Filed: Dec. 14, 1999

(86) PCT No.: PCT/FR99/03126

§ 371 (c)(1),
(2), (4) Date: Sep. 18, 2001

(87) PCT Pub. No.: WO00/37582

PCT Pub. Date: Jun. 29, 2000

(30) Foreign Application Priority Data

Dec. 18, 1998 (FR) ............................................ 98 16040

(51) Int. Cl.⁷ ................................................. C08K 3/00
(52) U.S. Cl. ........................ 524/800; 524/495; 525/233; 525/329.3; 525/338; 526/338; 526/342; 222/402.2; 222/402.24
(58) Field of Search ................................. 524/495, 800; 525/233, 329.3, 338; 526/338, 342; 222/402.2, 402.24

(56) References Cited

U.S. PATENT DOCUMENTS 5,290,539 A * 3/1994 Marecki ...................... 424/45

FOREIGN PATENT DOCUMENTS

GB 2323597 * 9/1998

* cited by examiner

Primary Examiner—Edward J. Cain
(74) Attorney, Agent, or Firm—Sughrue Mion, PLLC

(57) ABSTRACT

A valve or pump gasket for sealing a fluid dispenser device comprising a valve or a pump mounted on a fluid container, said gasket being characterized in that it comprises one or more of the following elastomer materials:
  a) a hydrogenated nitrile butadiene rubber (HNBR);
  b) an octene-ethylene copolymer (OEC); and
  c) a butyl or a halobutyl rubber.

13 Claims, No Drawings

VALVE OR PUMP JOINT

The present invention relates to a valve or pump gasket for sealing a fluid dispenser device comprising a valve or a pump mounted on a fluid container.

More particularly, the gaskets of the invention are suitable for being used both in dispenser devices for dispensing pressurized fluid and including valves, and in particular metering valves, and also in dispenser devices for dispensing non-pressurized fluid and including pumps.

The gaskets used in pressurized fluid dispensers, such as aerosol devices must satisfy certain conditions and requirements. Thus, such gaskets must offer good mechanical properties, and good resistance to moisture, and must not swell too much when in contact with the propellants. In particular, such characteristics are especially important for dynamic gaskets that provide sealing between the moving valve member of the valve and the valve chamber that contains the metered quantity to be expelled.

For various reasons, and in particular for ecological reasons, chlorofluorocarbon (CFC) type propellants have largely been replaced by hydrofluoro-carbon (HFC) propellants of the HFC-134a or HFC-227 types, with or without alcohol. The use of such propellants, in particular when they are used with about 20% by weight of ethanol being added, increases the stresses on the gaskets, so that the conventional materials that were used in association with CFC gases no longer present optimum characteristics.

In addition, the gaskets used in non-pressurized fluid dispenser devices, and in particular pumps, must also satisfy certain conditions and requirements. Thus, such gaskets must offer good resistance to solutions, in particular to water and ethanol solutions, i.e. solutions containing water, ethanol, or a mixture of water and of ethanol. Furthermore, such gaskets must offer good resistance to moisture and good resistance to preservative agents, such as quaternary ammonium compounds.

An object of the present invention is to provide valve or pump gaskets that satisfy the above-mentioned requirements.

An object of the present invention is to provide a valve gasket that is designed to come into contact with a fluid and with a propellant of the hydrofluoroalkane (HFA) type, with or without alcohol, and that guarantees good mechanical properties and/or low swelling and/or good resistance to moisture.

Another object of the present invention is to provide a pump gasket that offers good resistance to water/ethanol solutions and/or good resistance to moisture, and/or good resistance to preservative agents, such as quaternary ammonium compounds.

Yet another object of the present invention is to provide a valve or pump gasket that is simple and inexpensive to manufacture.

The present invention thus provides a valve or pump gasket for sealing a fluid dispenser device comprising a valve or a pump mounted on a fluid container, said gasket being characterized in that it comprises one or more of the following elastomer materials:
a) a hydrogenated nitrile butadiene rubber (HNBR);
b) an octene-ethylene copolymer (OEC); and
c) a butyl or a halobutyl rubber.

Advantageously, said gasket further comprises one or more other ingredient(s) such as inorganic fillers and/or carbon black fillers and/or vulcanization agents and/or pigments and/or processing agents and/or plasticizers.

The present invention further provides a pressurized fluid dispenser device comprising a valve provided with a moving valve member, said valve being mounted on a container containing both the fluid and also a propellant, with or without alcohol, the device having at least one neck gasket between the valve and the container, and a dynamic gasket through which said valve member slides, at least one of said gaskets being made according to the present invention.

Preferably, the propellant comprises a hydrofluoro-carbon (HFC) gas of the HFC-134a type or of the HFC-227 type.

The present invention further provides a non-pressurized fluid dispenser device comprising a pump mounted on a container containing the fluid and at least one gasket between the pump and the container, said gasket or at least one of said gaskets being made according to the invention.

In a first variant, the gasket comprises as a base polymer essentially a hydrogenated nitrile butadiene rubber (HNBR). This hydrogenated nitrile elastomer generally has the following chemical formula:

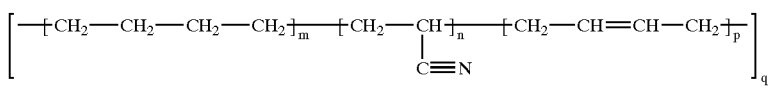

This product is commercially available, and is, in particular, sold by Bayer or by Nippon Zeon.

Hitherto, this elastomer has never been used as a valve or pump gasket.

It has been observed that, as a valve gasket, when it is in contact with a fluid of the HFC-134a or HFC-227 types, with or without alcohol (e.g. ethanol), it presents excellent mechanical properties, so that it is particularly suitable for being used as a dynamic gasket. Naturally, it can also be used as a neck gasket in such an aerosol device for providing sealing between the valve and the container containing the fluid and the propellant.

In second variant, the gasket may be made in the form of an alloy comprising HNBR and octene-ethylene copolymer (OEC). Adding polyoctene guarantees, in particular, that the gasket does not swell too much when in contact with propellants of the HFC type, with or without alcohol.

Particularly favorable results have been obtained, in particular, with a gasket material comprising about 20% by weight of HNBR and about 80% by weight of OEC. In this composition, the gasket is particularly inexpensive and easy to manufacture.

In a third variant embodiment, the elastomer component of the gasket may be an alloy of HNBR and of butyl (or halobutyl) rubber. Adding butyl or halobutyl rubber procures gaskets that offer good resistance to moisture and that do not swell too much in HFC-type propellants, with or without alcohol. Advantageous results have been obtained, in particular, with a gasket material comprising about 60% by weight of HNBR and about 40% by weight of butyl or of halobutyl rubber.

In a fourth variant, the elastomer component of the gasket may be an alloy of HNBR and of ethylene propylene (EP), or an alloy of HNBR and of ethylene-propylene-diene-monomer (EPDM). This type of alloy makes it possible to obtain gaskets that swell little, in particular with propellants of the HFC type, with or without alcohol, while also maintaining good mechanical properties. Favorable results have been obtained at reasonable manufacturing costs in particular with gaskets comprising about 50% by weight or more of HNBR and about 50% by weight or less of EP or of EPDM.

In other variants, the elastomer component may also be an alloy of HNBR and of poly-chloroprene rubber (CR) or an alloy of HNBR and of styrene butadiene rubber (SBR). These two types of alloy make it possible to obtain gaskets that have good mechanical properties and that do not swell too much in propellants of the HFC type, with or without alcohol.

HNBR is an elastomer component that is very advantageous in that it procures good mechanical properties. However, it is possible to consider making gaskets in which the elastomer component is octene-ethylene copolymer (OEC). In particular when its elastomer component comprises octene-ethylene copolymer alone, this type of gasket offers good mechanical properties and does not swell too much when in contact with propellants of the HFC type, with or without alcohol.

Furthermore, it is also possible to consider making gaskets in which the elastomer component comprises butyl or halobutyl rubber. In particular when its elastomer component comprises butyl or halobutyl rubber alone, this type of gasket offers good resistance to moisture and does not swell too much in propellants of the HFC type, with or without alcohol.

All of the above-described gasket materials may further comprise one or more other ingredients that are generally well-known in the field of gaskets. In particular, the gasket formulations may further comprise inorganic fillers or carbon black fillers, vulcanization agents, pigments, processing agents, or plasticizers.

The valve gaskets of the invention for aerosol devices may therefore be used in a large number of applications, their formulations depending mainly on the particular mechanical and sealing requirements as well as on the fluids and the propellants to be put in contact with said gaskets.

Another feature of the invention is that the gaskets of the present invention are also applicable to non-pressurized fluid dispensers including pumps mounted on containers. In which case, the gasket(s) providing the sealing between the pump and the container may be made of one of the above-described materials, thereby making it possible to obtain good resistance to water/ethanol solutions, good resistance to moisture as well as good resistance to preservatives in particular to quaternary ammonium compounds. These properties are particularly advantageous in gasket formulations including HNBR, either alone or in an alloy.

Ease of manufacture and low cost are also advantageous features of the gaskets of the present invention.

Although particular composition ratios have been described above with reference to various gasket formulation variants, the present invention is not limited to these ratios, and the scope of the patent is defined by the accompanying claims.

What is claimed is:

1. A pressurized fluid dispenser device comprising a valve provided with a moving valve member, said valve being mounted on a container containing the fluid and a propellant, the device having at least one neck gasket between the valve and the container, and a dynamic gasket through which said valve member slides; and
    wherein the propellant compromises a hydrofluorocarbon (HFC) gas of the HFC-134a type or of the HFC-227 type; and
    at least one of said gaskets compromises a hydrogenated nitrile butadiene rubber (HNBR).

2. A device according to claim 1, in which said gasket comprises an alloy of HNBR and of octene-ethylene copolymer (OEC).

3. A device according to claim 2, in which the gasket comprises about 20% by weight of HNBR and about 80% by weight of OEC.

4. A device according to claim 1, in which said gasket comprises an alloy of HNBR and of butyl or of halobutyl rubber.

5. A device according to claim 4, in which said gasket comprises about 60% by weight of HNBR and about 40% by weight of butyl or of halobutyl rubber.

6. A device according to claim 1, in which said gasket comprises an alloy of HNBR and of ethylene propylene (EP) or of ethylene-propylene-diene-monomer (EPDM).

7. A device according to claim 6, in which said gasket comprises about 50% by weight or less of EP or of EPDM.

8. A device according to claim 1, in which said gasket comprises an alloy of HNBR and of poly-chloroprene rubber (CR).

9. A device according to claim 1, in which said gasket comprises an alloy of HNBR and of styrene butadiene rubber (SBR).

10. The device according to claim 1, wherein the propellant includes alcohol.

11. The device according to claim 1, wherein the propellant does not include alcohol.

12. A device according to claim 1, in which said gasket further comprises one or more of the ingredients: inorganic fillers, carbon black fillers, vulcanization agents, pigments, processing agents, and plasticizers.

13. A device according to claim 1, in which said gasket further comprises one or more other ingredient(s) such as inorganics fillers and/or carbon black fillers and/or vulcanization agents and/or processing agents and/or plasticizers.

* * * * *